(12) United States Patent
Anghel et al.

(10) Patent No.: US 10,411,562 B2
(45) Date of Patent: Sep. 10, 2019

(54) COMPACT HIGH SPEED GENERATOR HAVING PASSAGEWAYS FOR AIR AND COOLING OIL

(71) Applicant: HONEYWELL INTERNATIONAL INC., Morris Plains, NJ (US)

(72) Inventors: Cristian Anghel, Oro Valley, AZ (US); Toren S Davis, Peoria, AZ (US); Tom Phielix, Tuscon, AZ (US); Wayne Pearson, Oro Valley, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 808 days.

(21) Appl. No.: 14/995,785

(22) Filed: Jan. 14, 2016

(65) Prior Publication Data

US 2017/0207683 A1 Jul. 20, 2017

(51) Int. Cl.
*H02K 9/19* (2006.01)
*H02K 9/197* (2006.01)
*H02K 3/48* (2006.01)
*H02P 9/00* (2006.01)
*B60K 6/405* (2007.10)
(Continued)

(52) U.S. Cl.
CPC .............. *H02K 9/19* (2013.01); *H02K 3/48* (2013.01); *H02K 9/197* (2013.01); *H02P 9/00* (2013.01); *B60K 1/00* (2013.01); *B60K 6/26* (2013.01); *B60K 6/405* (2013.01); *B60K 2001/006* (2013.01); *B60Y 2200/92* (2013.01); *B60Y 2306/05* (2013.01); *B60Y 2410/10* (2013.01); *H02K 5/20* (2013.01); *H02K 5/22* (2013.01); *H02K 7/003* (2013.01); *H02K 11/33* (2016.01); *H02K 2205/12* (2013.01)

(58) Field of Classification Search
CPC ........ H02K 5/22; H02K 9/19; H02K 2209/00; H02K 11/33; B60K 1/00; B60K 6/26; B60K 6/405; B60K 2001/06; B60Y 2200/92; B60Y 2306/05; B60Y 2410/10
USPC .................................. 310/54, 57, 58, 64, 89
See application file for complete search history.

(56) References Cited

U.S. PATENT DOCUMENTS 2,707,244 A 4/1955 Kilgore et al.
2,873,393 A 2/1959 Baudry
(Continued)

OTHER PUBLICATIONS

Search Report and Office Action from EP application No. 18170935.3 dated Aug. 3, 2018.

(Continued)

*Primary Examiner* — Julio C. Gonzalez
*Assistant Examiner* — Rashad H Johnson
(74) *Attorney, Agent, or Firm* — Shimokaji IP

(57) ABSTRACT

A method for generating electrical power may include the steps of rotating a rotor of a generator at a speed in excess of about 12,000 revolutions per minute (rpm) to about 25,000 rpm and producing power with the generator at a rate in excess of about 800 kilowatts (kW). The generator has a power/weight ratio no smaller than about 3 kW/lbs. A rotor is cooled with cooling oil internally circulated through the rotor of the generator so that contact of cooling oil with external surfaces of the rotor may be precluded. The stator is also cooled with oil that is prevented from contacting the external surfaces of the rotor. Pressurized airflow may be produced in a gap between the rotor and a stator of the generator to preclude entry of cooling oil into the gap.

19 Claims, 6 Drawing Sheets

(51) Int. Cl.
*H02K 11/33* (2016.01)
*H02K 5/22* (2006.01)
*B60K 6/26* (2007.10)
*B60K 1/00* (2006.01)
*H02K 5/20* (2006.01)
*H02K 7/00* (2006.01)

(56) References Cited

U.S. PATENT DOCUMENTS

| | | | |
|---|---|---|---|
| 3,502,920 A | | 3/1970 | Chaboseau |
| 3,648,085 A | * | 3/1972 | Fujii .................. H02K 9/19 310/54 |
| 3,675,056 A | | 7/1972 | Lenz |
| 3,805,101 A | | 4/1974 | Purman |
| 4,514,652 A | | 4/1985 | Sundstrand |
| 4,600,848 A | | 7/1986 | Sundstrand |
| 5,652,469 A | | 7/1997 | Boardman et al. |
| 6,710,479 B2 | * | 3/2004 | Yoshida .................. H02K 1/20 310/52 |
| 8,035,261 B2 | | 10/2011 | Harb et al. |
| 2003/0075996 A1 | | 4/2003 | Yoshida et al. |
| 2004/0146411 A1 | | 7/2004 | Maceyka |
| 2010/0079028 A1 | * | 4/2010 | Turner .................. H02K 3/487 310/214 |
| 2013/0221772 A1 | | 8/2013 | Miyamoto et al. |
| 2014/0056721 A1 | | 2/2014 | Eco |
| 2014/0265657 A1 | * | 9/2014 | Raczek .................. H02K 9/19 310/54 |
| 2015/0171707 A1 | | 6/2015 | Shoykhet |
| 2017/0194840 A1 | * | 7/2017 | Garriga .................. H02K 5/20 |
| 2017/0207683 A1 | * | 7/2017 | Anghel .................. H02K 9/197 |
| 2018/0205294 A1 | * | 7/2018 | Manabe .................. H02K 9/19 |

OTHER PUBLICATIONS

Search Report and Office Action from EP application No. 16197187.4 dated May 29, 2017.

* cited by examiner

COMPACT HIGH SPEED GENERATOR HAVING PASSAGEWAYS FOR AIR AND COOLING OIL

GOVERNMENT RIGHTS

This invention was made with Government support under Tactically Exploited Reconnaissance Node (TERN)—Phase II contract HR0011-13-C-0099 subcontract 25172 awarded by DARPA. The Government has certain rights in this invention.

BACKGROUND OF THE INVENTION

The present invention relates generally to producing high power output from compact electrical generators. More particularly, the invention relates to cooling such generators and mitigation of windage losses that may result from such cooling.

There is an increasing need for high power generators in the 500 kilowatts (kW) to 1 megawatt (MW) range for hybrid-electric propulsion and directed energy weapons. At the same time, these applications require low weight and volume. Small and light-weight generators must be operated at high rotational speeds in order to produce high power outputs. High amounts of heat are produced during operation of such generators. Oil cooling is typically employed to maintain operating temperatures of such generators at a tolerable level.

Oil-based cooling systems are advantageously compact and efficient, but there has heretofore been a practical limit to their effective application. At rotational speeds of about 12,000 revolutions per minute (rpm) or more, a generator may experience high windage friction forces that develop when oil enters a gap between a rotor and a stator of the generator. As the rotor rotates at a high speed, windage friction may heat the oil in the gap beyond its temperature limit if not replenished with an adequate amount of lower temperature oil. This constant oil bath may have the counterproductive effect of producing higher rotating friction or windage reducing the overall efficiency of the generator. In that context, heat-reducing benefits of oil-based cooling may be offset by heat production resulting from windage friction arising from a presence of oil in the air gap. Undesirable windage friction may also arise if cooling oil is sprayed in the generator and the oil spray is allowed to contact exterior surfaces of the rotor.

As can be seen, there is a need for generator cooling system that will retain its effectiveness at high rotational speeds. More particularly, there is a need for such a system that may eliminate windage friction resulting from cooling oil contact with exterior surfaces of a rotor and/or presence of oil in an air gap between a rotor and a stator of the generator.

SUMMARY OF THE INVENTION

In one aspect of the present invention, an oil-cooled electrical generator comprises: a stator; a rotor; a gap between the stator and the rotor; an air passageway passing through the stator to the gap; a source of pressurized air in fluid communication with the air passageway; and passageways for cooling oil, wherein the passageways for cooling oil are fluidly isolated from the gap.

In another aspect of the present invention, apparatus for cooling a generator comprises: a cooling oil spray nozzle directed at end turns of windings of a stator of the generator; a spray shield having an internal chamber fluidly isolated from the spray nozzle; wherein the internal chamber is in fluid communication with a gap between a rotor of the generator and the stator.

In still another aspect of the present invention, a method for generating electrical power comprises the steps of: rotating a rotor of a generator at a speed in excess of about 12,000 rpm to about 25,000 rpm; producing power with the generator at a rate in excess of about 800 kilowatts (kW); cooling the rotor with cooling oil; and producing pressurized airflow in an gap between the rotor and a stator of the generator to preclude entry of cooling oil into the gap, wherein the generator has a power/weight ratio no smaller than about 3 kW/lbs.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

The present invention generally may provide a system for producing high power output from a compact electrical generator. More particularly, the invention may provide a capability for reducing windage friction in the generator by precluding entry of cooling oil into an air gap between a rotor and a stator, and contact of cooling oil with other exterior surfaces of a rotor of the generator.

Figure 1:
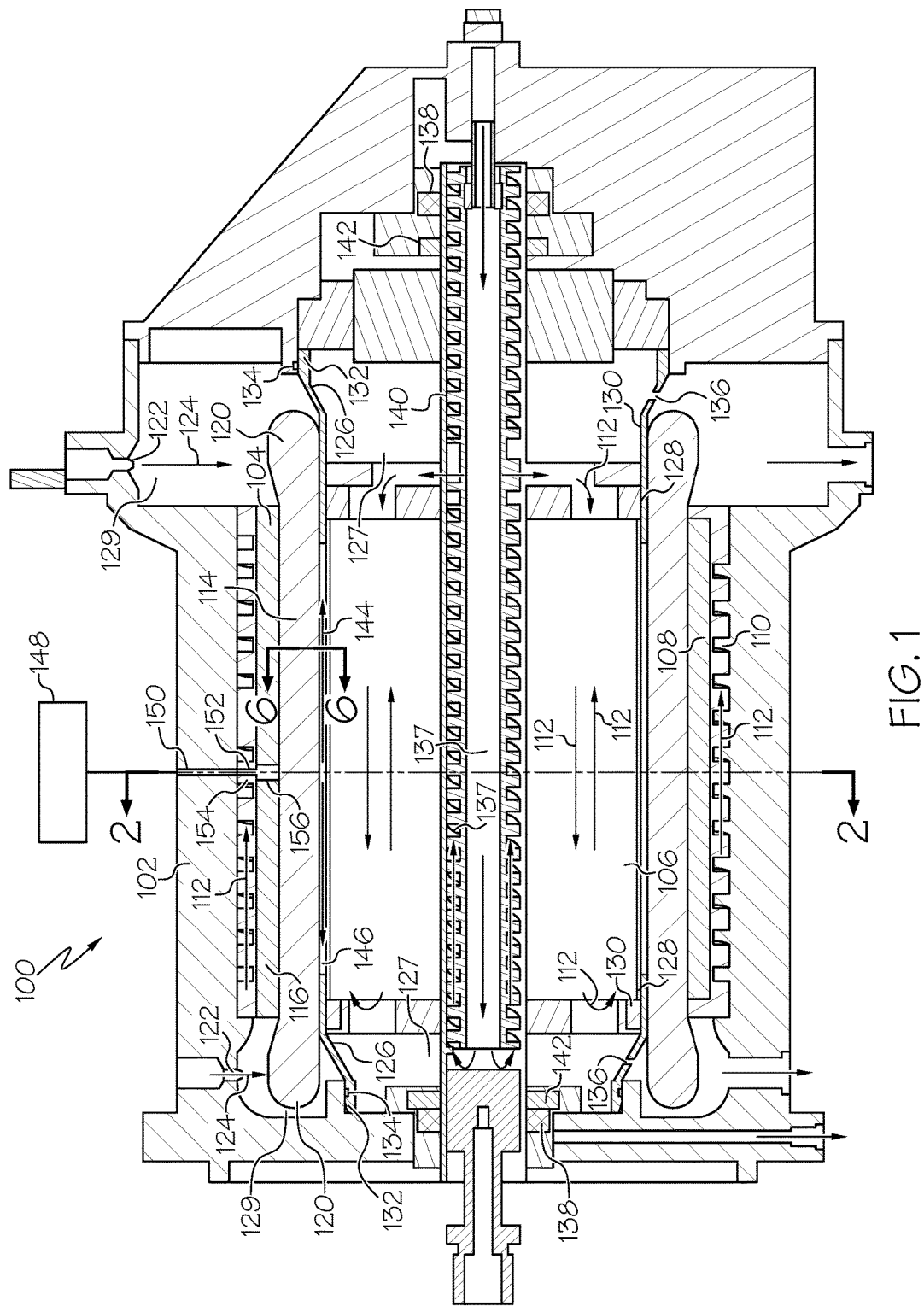
FIG. 1 is a cross-sectional view of a generator in accordance with an exemplary embodiment of the invention.
Figure 2:
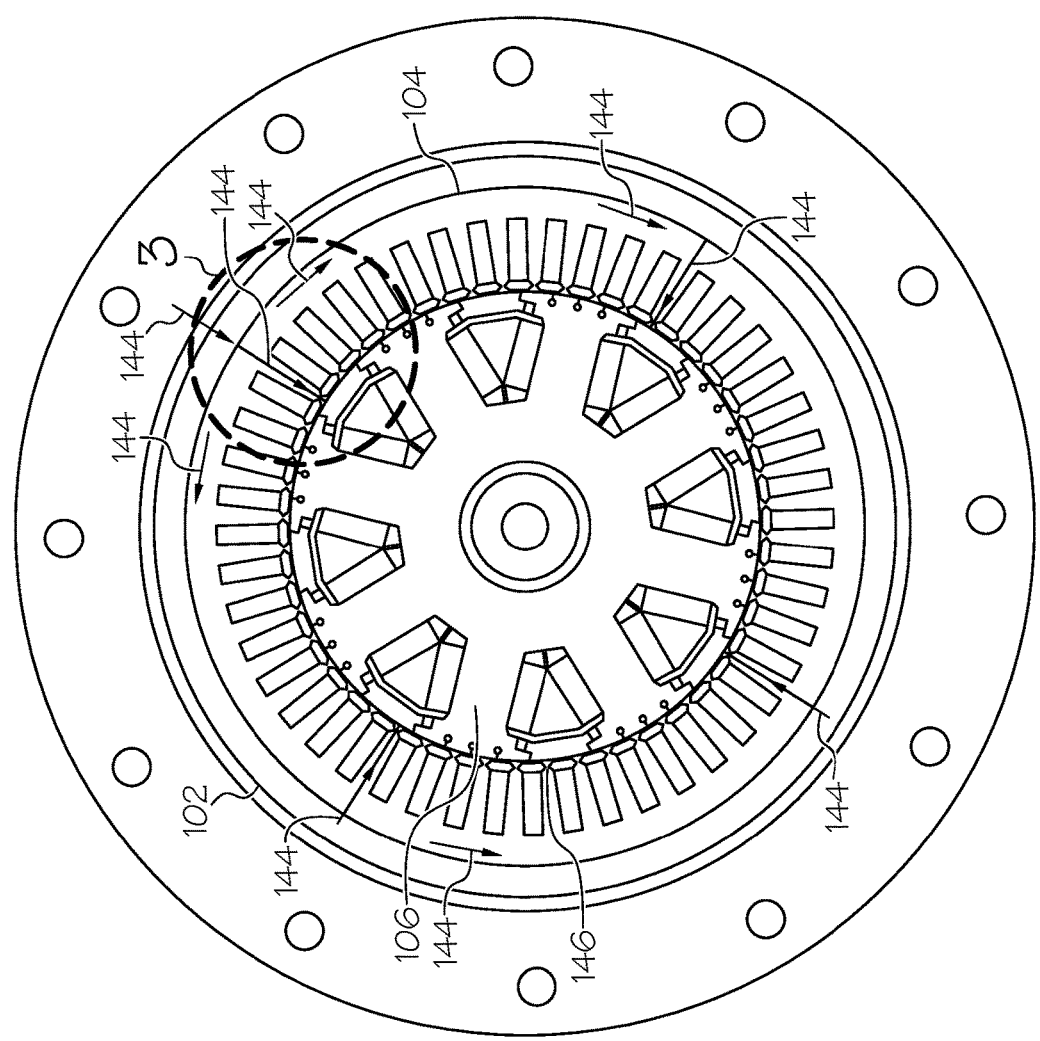
FIG. 2 is cross-sectional view of the generator of FIG. 1 taken along line 2-2 in accordance with an exemplary embodiment of the invention.
Figure 3:
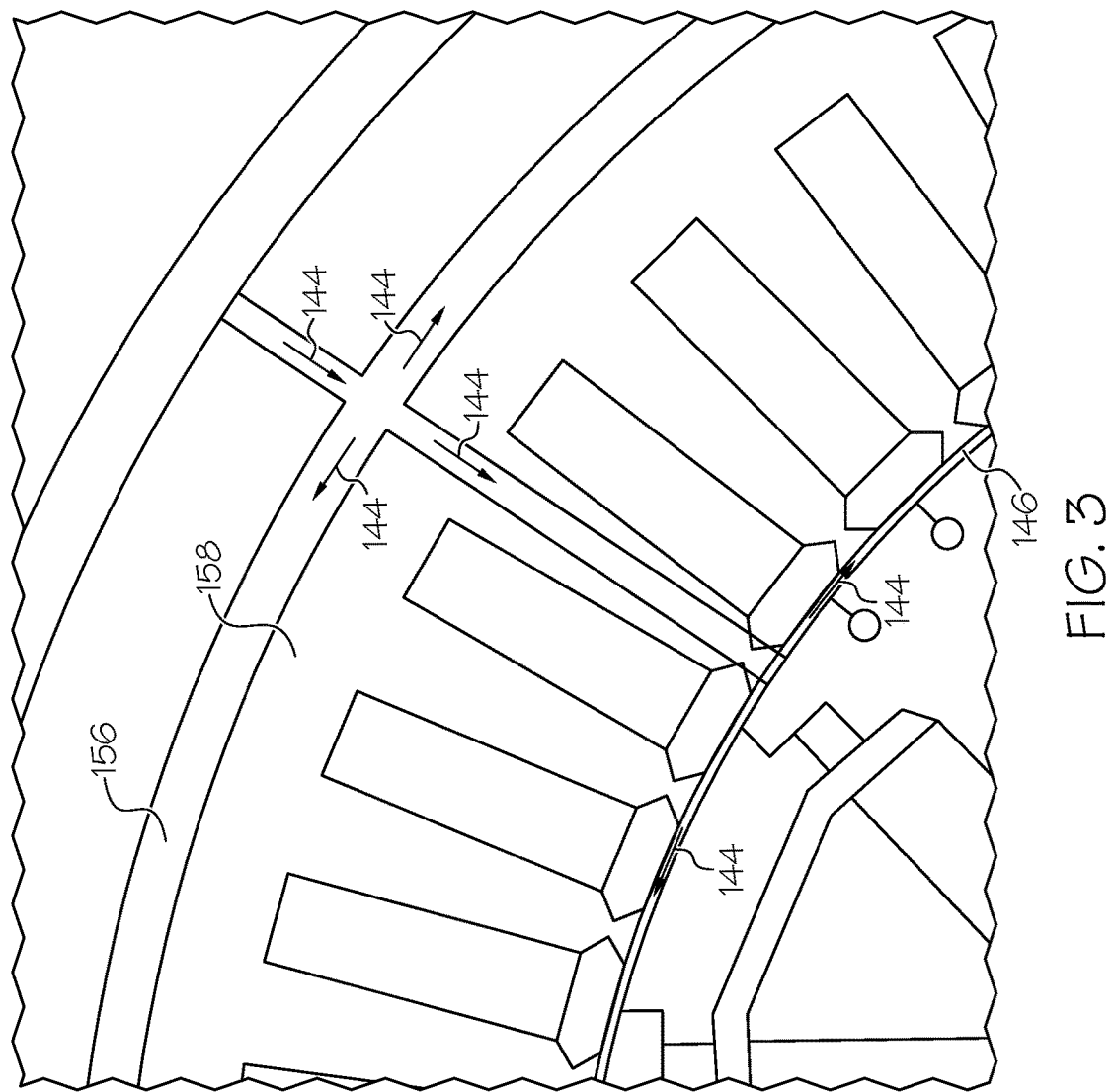
FIG. 3 is detailed view of a portion of the cross-sectional view of FIG. 2 in accordance with an exemplary embodiment of the invention.
Figure 4:
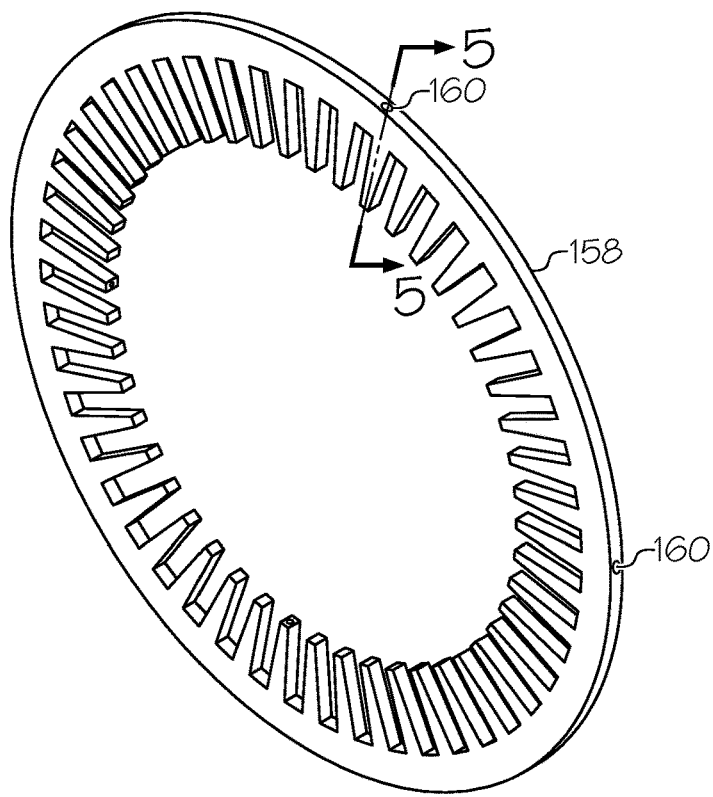
FIG. 4 is a perspective view of a stator lamination of the generator of FIG. 1 in accordance with an exemplary embodiment of the invention.
Figure 5:
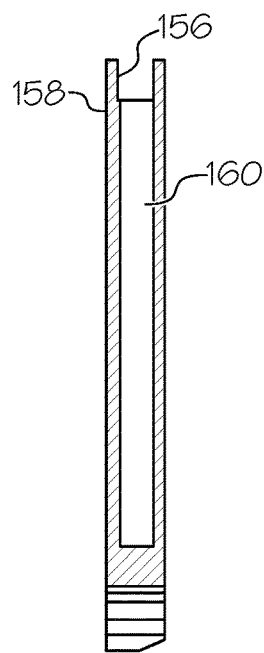
FIG. 5 is detailed view of a portion of the lamination of FIG. 4 in accordance with an exemplary embodiment of the invention.

Referring now to FIG. 1, a cross sectional view illustrates an oil-cooled generator 100 constructed in accordance with an exemplary embodiment of the invention. The generator 100 may include a housing 102, a stator 104 and a rotor 106.

A back iron 108 may surround the stator 104. The back iron 108 may be provided with a spiral grove 110 along its length. Cooling oil 112 may be circulated through the spiral groove 110. Thus, the spiral grove 110 may be considered to be a cooling-oil passageway 110.

The stator 104 may include windings 114, laminations of a first type 116 (hereinafter laminations 116) and one or more laminations of a second type 158 (hereinafter center lamination 158), as will be explained hereinbelow. Spray nozzles 122 may deliver cooling-oil spray 124 onto the end turns 120. Cylindrical spray shield 126 with internal chambers 127 may be positioned to deflect the cooling-oil spray 124. First portions 128 of outer surfaces 130 of the spray shields 126 may be adhesively bonded to the stator 104. Second portions 132 of the outer surfaces 130 of the spray shields 126 may be sealed against the housing 102 with seals such as O-rings 134. In other words, the oil spray 124 may be constrained within spray chambers 129 externally of the spray shields 126. Thus, cooling oil spray 124 may be precluded from contacting outer surfaces of the rotor 106. Consequently, the rotor 106 may be rotated at a high rotational speed without encountering windage friction forces arising from presence of the cooling oil spray 124 in the generator 100.

Cooling oil 112 may be circulated through cooling oil passageways 137 internally through the rotor 106 and through bearings 138 which support a shaft 140 of the rotor 106. The bearings 138 may be fluidly isolated from interiors of the spray shields 126 with seals 142. Consequently, cooling oil 112 circulating through the rotor 106 may be precluded from contacting external surfaces of the rotor 106 even though the rotor 106 is advantageously cooled by the cooling oil 112.

Pressurized airflow 144 may be introduced into a gap 146 between the rotor 106 and the stator 104. The airflow 144 may preclude entry of cooling oil 112 into the gap, thus further assuring that external surfaces of the rotor 106 are not contacted by the cooling oil 112.

As a consequence of precluding contact of cooling oil 112 with external surfaces of the rotor 106, the rotor 106 may be rotated at high rotational speeds without experiencing windage friction forces from the cooling oil 112.

Referring now to FIGS. 1-5, it may be seen how the airflow 144 may be produced within the gap 146. A source 148 of pressurized air may be in fluid communication with a port 150 in the housing 102. The port 150 may be aligned with air passageway 152 that may pass through a land 154 of the back iron 108. The air passageway 152 may be in fluid communication with an annular groove 156 of a center lamination 158. The center lamination 158 may be provided with air-passageway holes 160 passing from the annular groove 156 to the gap 146. Consequently, the gap 146 may be in fluid communication with the source 148 of pressurized air.

The source 148 may provide pressurized air to the gap 146 so that the airflow 144 in the gap 146 may take place at a pressure of about 3 psi to about 5 psi, as an example. The airflow 144 may pass through the gap 146 and into the internal chambers 127 of the spray shields 126. The airflow 144 may emerge from the spray shields 126 through drain holes 136. The holes 136 may be positioned so that they are oriented within the generator 100 to facilitate gravity drain at different generator attitude orientations. With such positioning of the holes 136, the oil spray 124 from the spray nozzles 122 may be precluded from entering the spray shields 126 through the holes 136.

Figure 6:
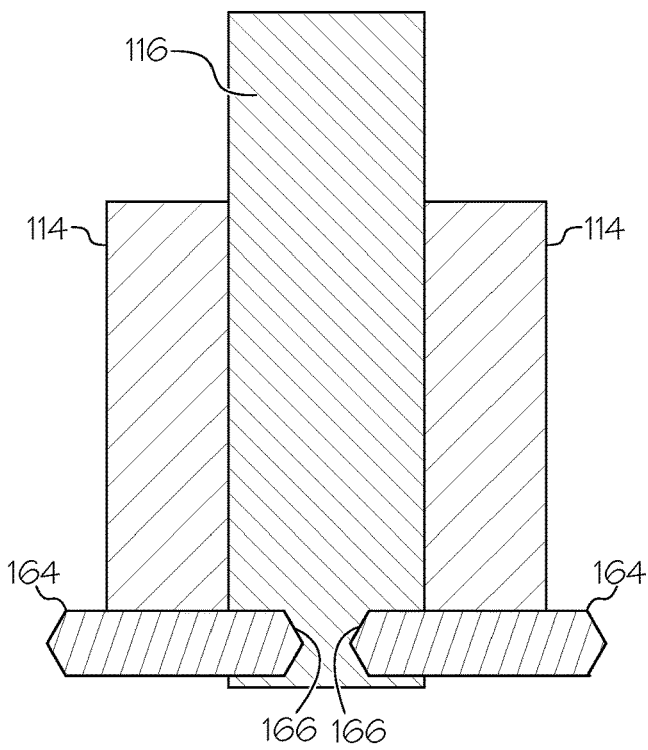
FIG. 6 is a cross-sectional view of the generator of FIG. 1 taken along line 6-6 in accordance with an exemplary embodiment of the invention.
Figure 7:
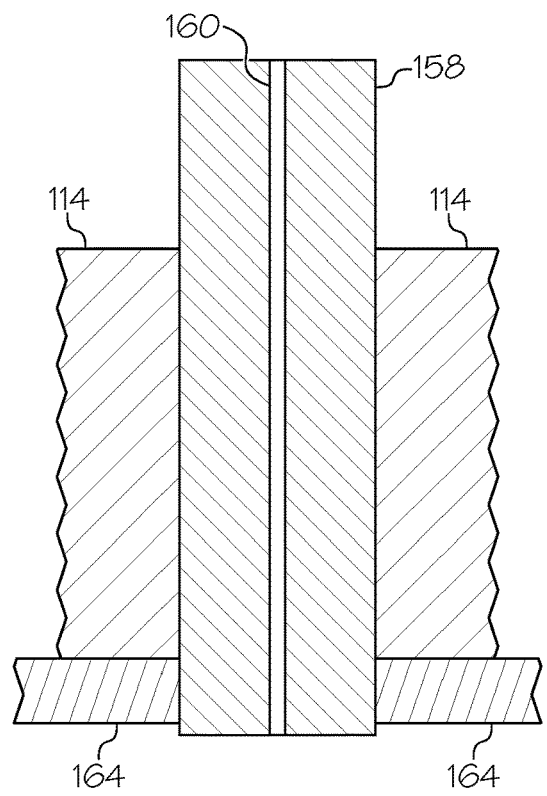
FIG. 7 is a cross-sectional view of a portion of the view of FIG. 2 taken along the line 7-7 in accordance with an exemplary embodiment of the invention.

By referring now to FIGS. 6 and 7, it may be noted that the stator windings 114 may be held in position with wedges segments 164 that are interlocked with notches 166 formed in the stator laminations 116. However, the center lamination 158 may be constructed without wedge-supporting notches. Thus, the wedge segments 164 may terminate at the center lamination 158. In other words, unlike prior art generator configuration in which a single wedge may extend along an entire length of a stator, the windings 114 of the generator 100 may be supported with partial-length wedge segments 164. A first wedge segment 164 may extend from a first end of the stator 104 to the center lamination 158. A second wedge segment 164 may extend from an opposite end of the stator 104 to the center lamination 158.

It may be seen that rotation of the rotor 106 may be unencumbered by windage friction from the cooling oil 122. Consequently, the generator 100 may be particularly useful in applications that may require a compact and lightweight configuration for a generator while, at the same time, producing a high power output. For example, the generator 100 may be constructed with an overall weight of about 250 pounds to about 300 pounds and it may have a capability of generating about 800 kW to about 1,000 kW. In order to produce such high power output, the generator 100 may need to operate with rotor rotational speeds of about 12,000 to about 25,000 rpm.

Figure 8:
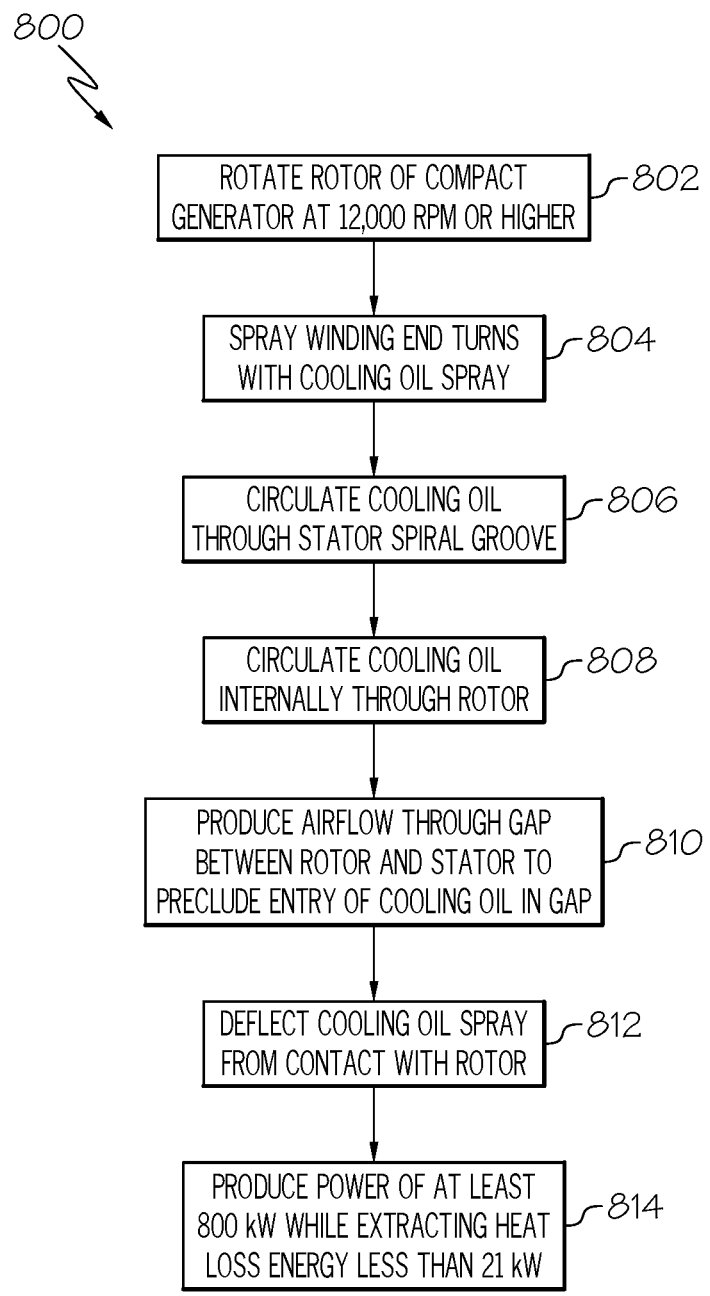
FIG. 8 is a flow chart of a method for generating electrical power in accordance with an exemplary embodiment of the invention.

Referring now to FIG. 8, a flow chart illustrates an exemplary embodiment of a method 800 for generating electrical power with a compact generator that weighs no more than about 300 pounds and can output about 1,000 kW of useful electrical power. In other words, the generator may have a power/weight ratio of about 3 kW/lbs. Cooling of the generator may require extraction of no more than about 21 kW of heat loss energy from the generator when the generator is producing full power.

In a step 802, a rotor of the compact generator may be rotated at a high rotational speed (e.g., the rotor 106 of the generator 100 may be rotated at a speed of at least about 12,000 rpm). In a step 804, stator windings of the generator may be sprayed with cooling oil (e.g., Cooling oil spray 124 may be sprayed from nozzles 122 onto end turns 120 of stator windings 114 of the generator 100). In a step 806, cooling oil may be internally circulated through the stator spiral groove 110. In a step 808, a rotor of the generator may be cooled with internally circulating cooling oil (e.g., cooling oil 112 may be circulated internally through the rotor 106). In a step 810, airflow may be produced through a gap between the rotor and the stator of the compact generator to preclude entry of cooling oil into the gap (e.g., pressurized air may be provided from the source 148 through a center lamination 158 of the stator 104 into the gap 146 to produce the airflow 144, which airflow continues through the spray shields 126 and exits from the holes 136 in the spray shields 126). In a step 812, sprayed cooling oil may be deflected away from the rotor (e.g., the spray shields 126 to deflect the cooling oil spray 124 from the rotor 106 so that the rotor 106 is not encumbered with windage friction forces that may have been produced by contact with the cooling oil spray 124). In a step 814, electrical power may be produced by the compact generator at a rate of at least about 800 kW while heat loss energy of less than about 21 kW may be extracted by the circulated cooling oil.

It should be understood, of course, that the foregoing relates to exemplary embodiments of the invention and that modifications may be made without departing from the spirit and scope of the invention as set forth in the following claims.

We claim:

1. An oil-cooled electrical generator, comprising:
a stator;
a rotor;
a gap between the stator and the rotor;
an air passageway passing through the stator to the gap;
a source of pressurized air in fluid communication with the air passageway;
passageways, around the stator and through the rotor, for cooling oil;
wherein the passageways for cooling oil are fluidly isolated from the gap;
a cooling oil spray nozzle interconnected with a spray chamber surrounding end turns of stator-windings;
a spray shield interposed between the spray chamber and the gap to block oil spray from entering the gap;
wherein the spray shield includes a first portion of an outer surface bonded to an inner radial surface of the stator and includes a second portion of the outer surface sealed against a housing of the generator.

2. The generator of claim 1 wherein the gap is in fluid communication with an interior of the spray shield.

3. The generator of claim 1 wherein the spray shield is provided with one or more drain ports.

4. The generator of claim 3 wherein the drain port is located in a position that facilitates gravity drain at different generator attitude orientations.

5. The generator of claim 1:
wherein the stator comprises a plurality of laminations of a first type and a lamination of a second type; and
wherein the air passageway through the stator comprises a hole in the lamination of the second type.

6. The generator of claim 5 further comprising:
stator windings;
stator-winding support wedge segments;
wherein a first stator-winding support wedge segment extends from the lamination of the second type to a first end turn the stator winding; and
wherein a second stator-winding support wedge segment extends from the lamination of the second type to a second end turn of the stator winding opposite the first end turn.

7. The generator of claim 5 wherein the lamination of the second type is provided with a plurality of air-passageway holes.

8. The generator of claim 7 wherein the lamination of the second type is provided with an annular groove interconnecting the plurality of the air-passageway holes.

9. Apparatus for cooling a generator, comprising:
a cooling oil spray nozzle directed at end turns of windings of a stator of the generator;
a spray shield having an internal chamber fluidly isolated from the spray nozzle;
wherein the spray shield includes a first portion of an outer surface bonded to an inner radial surface of the stator and includes a second portion of the outer surface sealed against a housing of the generator;
wherein the internal chamber is in fluid communication with a gap between a rotor of the generator and the stator.

10. The apparatus of claim 9 further comprising:
a cooling-oil passageway surrounding the stator;
an air passageway passing the cooling-oil passageway, being fluidly isolated from the cooling-oil passageway and being in fluid communication with the gap;
a source of pressurized air in fluid communication with the air passageway.

11. The apparatus of claim 10:
wherein the cooling-oil passageway is a spiral groove in contact with a cylindrical back iron; and
wherein the air passageway passes radially through a land portion of the spiral groove and back iron.

12. The apparatus of claim 10 wherein the air passageway passes through a lamination of the stator.

13. The apparatus of claim 12 wherein the air passageway includes an annular grove interconnecting a plurality of holes in the lamination.

14. A method for generating electrical power comprising the steps of:
rotating a rotor of a generator at a speed in excess of about 12,000 revolutions per minute (rpm) to about 25,000 rpm;
producing power with the generator at a rate in excess of about 800 kilowatts (kW);
cooling the rotor and a stator with cooling oil from a cooling oil spray nozzle;
producing pressurized airflow in an gap between the rotor and a stator of the generator to preclude entry of cooling oil into the gap;
blocking oil spray from entering the gap by using a spray shield;
wherein the spray shield includes a first portion of an outer surface bonded to an inner radial surface of the stator and includes a second portion of the outer surface sealed against a housing of the generator; and
wherein the generator has a power/weight ratio no smaller than about 3 kW/lbs.

15. The method of claim 14 wherein the pressurized airflow has a pressure no greater than about 4 psi to about 5 psi.

16. The method of claim 14 further comprising the step of lubricating rotor-support bearings with portions of the cooling oil that is internally circulated through the rotor.

17. The method of claim 14 further comprising the steps of:
spraying end turns of stator windings with cooling oil; and
deflecting sprayed cooling oil away from the rotor so that the sprayed cooling oil is precluded from contacting the rotor.

18. The method of 15 wherein the step of producing the airflow includes introducing air into the gap through a lamination of the stator of the generator.

19. The method of claim 14 wherein cooling of the generator requires extraction of no more than about 30 kW of heat loss energy from the generator when the generator is producing full power.

* * * * *